(12) United States Patent
Sunnegårdh

(10) Patent No.: US 12,718,970 B2
(45) Date of Patent: Aug. 25, 2026

(54) DYNAMIC SUBMARINE POWER CABLE SYSTEM WITH BEND RESTRICTION DEVICE

(71) Applicant: NKT HV Cables AB, Lyckeby (SE)

(72) Inventor: Peter Sunnegårdh, Kallinge (SE)

(73) Assignee: NKT HV Cables AB, Lyckeby (SE)

( * ) Notice: Subject to any disclaimer, the term of this patent is extended or adjusted under 35 U.S.C. 154(b) by 198 days.

(21) Appl. No.: 18/585,391

(22) Filed: Feb. 23, 2024

(65) Prior Publication Data

US 2024/0355506 A1 Oct. 24, 2024

(30) Foreign Application Priority Data

Feb. 28, 2023 (EP) .................................... 23159058

(51) Int. Cl.

| | |
|---|---|
| ***H01B 7/00*** | (2006.01) |
| ***H01B 7/14*** | (2006.01) |
| ***H02G 3/04*** | (2006.01) |
| ***H02G 9/12*** | (2006.01) |

(52) U.S. Cl.
CPC ............. *H01B 7/14* (2013.01); *H02G 3/0462* (2013.01); *H02G 9/12* (2013.01)

(58) Field of Classification Search
CPC ........... H01B 7/14; H02G 3/0462; H02G 9/12
See application file for complete search history.

(56) References Cited

U.S. PATENT DOCUMENTS

2014/0060884 A1* 3/2014 Patel .................... H01B 13/062 174/102 A
2023/0019405 A1 1/2023 Thyrvin et al.

FOREIGN PATENT DOCUMENTS

| | | |
|---|---|---|
| JP | H07177637 A | 7/1995 |
| WO | 2022027849 A1 | 2/2022 |
| WO | 2022267624 A1 | 12/2022 |

OTHER PUBLICATIONS

KR 102636814 B1 (Year: 2022).*
JPH 07177637A (Year: 1995).*
Resner, Leszek, et al.; "Radial Water Barrier in Submarine Cables, Current Solutions and Innovative Development Directions"; Energies, vol. 14, No. 10; MDPI; May 12, 2021; 20 Pages.
Extended European Search Report; Application No. 23159058.9; Completed: Jul. 21, 2023; Issued: Jul. 31, 2023; 9 Pages.

* cited by examiner

*Primary Examiner* — Pete T Lee
(74) *Attorney, Agent, or Firm* — Whitmyer IP Group LLC

(57) ABSTRACT

A submarine power cable system including: a dynamic submarine power cable having an element with a first axial section and a second axial section which are joined at a joint location; and a bend restriction device arranged around the dynamic submarine power cable, wherein the bend restriction device extends axially over the joint location, and wherein the bend restriction device is arranged to restrict bending of the dynamic submarine power cable at the joint location.

15 Claims, 2 Drawing Sheets

DYNAMIC SUBMARINE POWER CABLE SYSTEM WITH BEND RESTRICTION DEVICE

TECHNICAL FIELD

The present disclosure generally relates to submarine power cable systems.

BACKGROUND

Power generating floating offshore structures such as floating wind turbines are connected to a dynamic submarine power cable to deliver power generated by the floating wind turbine to an electrical grid. Other types of floating offshore structures such as floating oil platforms may be connected to a dynamic submarine power cable for power consumption purposes.

Floating offshore structures are subjected to wave movement. Therefore, dynamic submarine power cables are specially designed with improved fatigue properties, for example by the provision of a corrugated metallic water barrier.

SUMMARY

Dynamic submarine power cables currently in use have been deployed in relatively shallow waters, up to a few hundred meters. Therefore, such cables can be made in a single length, i.e., without jointing of any cable component.

In case a dynamic submarine power cable is to be deployed at greater depth, the corrugations of the corrugated metallic water barrier at depths close to the seabed may collapse due to the high hydrostatic pressure. Hereto, for installations at greater depths, it may be beneficial to make the metallic water barrier transition from corrugated to smooth at deeper water levels by means of jointing a corrugated section and a smooth section of the metallic water barrier. Additionally, or alternatively, depending on the length of the dynamic submarine power cable, the cable may comprise a joint of some other components, for example the conductor.

The highest bending forces acting on a dynamic submarine power cable are typically close to the floating structure from which it is suspended to the seabed. Here, typically the dynamic submarine power cable may be provided with a bend stiffener, a bellmouth, or similar device, to restrict bending of the dynamic power cable close to the floating structure. While not as pronounced as in the platform region, cable movements do occur along essentially the entire section of the dynamic submarine power cable extending between the floating structure and the seabed. Since the dynamic submarine power cable is unprotected from bending underwater, it is riskier to deploy a long length dynamic submarine power cable with any kind of component joint in deeper waters.

In view of the above, a general object of the present disclosure is to provide a submarine power cable system which solves or at least mitigates problems of the prior art.

There is hence according to a first aspect of the present disclosure provided a submarine power cable system comprising: a dynamic submarine power cable comprising an element having a first axial section and a second axial section which are joined at a joint location, and a bend restriction device arranged around the dynamic submarine power cable, wherein the bend restriction device extends axially over the joint location, and wherein the bend restriction device is configured to restrict bending of the dynamic submarine power cable at the joint location.

The bend restriction device thus limits bending of the dynamic submarine power cable along an axial section of the dynamic submarine power cable which contains the joint location. The element may thus be better protected from fatigue damage at the joint location. A dynamic submarine power cable that can be used for installation at larger installation depths may thereby be provided.

According to one embodiment the bend restriction device comprises at least one of a bend stiffener, a bend restrictor, a tube, or a pipe.

The bend restriction device may for example comprise metal, such as stainless steel, and/or a polymeric material, such as a thermosetting, thermoplastic, and/or elastomeric polymer.

According to one embodiment the dynamic submarine power cable has a top end to which the first axial section extends, and a bottom end to which the second axial section extends.

The bottom end of the dynamic submarine power cable may be configured to be connected to a rigid or flexible submarine joint on the seabed, which connects the dynamic submarine power cable with a static submarine power cable.

According to one embodiment the joint location is arranged at a distance of at least 50 m from the top end and from the bottom end.

According to one embodiment the element is a metallic water blocking layer.

The metallic water blocking layer is a radial water blocking barrier, i.e., it prevents radial water penetration into the insulation system of the submarine power cable.

According to one embodiment the metallic water blocking layer is corrugated along the first axial section and smooth along the second axial section.

According to one embodiment the metallic water blocking layer comprises a copper material or stainless steel.

According to one embodiment the copper material is Cu-DHP, Cu-ETP, or Cu—OF. These copper materials are not intentionally alloyed coppers and are one-phase metals which do not undergo any hardening process during solidification, which is most beneficial for the weld quality.

The copper material may according to one example comprise a copper alloy such as a copper-nickel alloy.

According to one embodiment the stainless steel is an austenitic stainless steel type selected from one of type 304, 304L, 316, or 316L, 316Ti, 316Cb 321, or 347 as defined by ASTM A240/A240M-22b or equivalents thereof according to EN 10088-1:2005.

According to one embodiment the element is a conductor.

The element may according to one example be an armour layer including a plurality of metal elements. One or more, for example all, metal elements, or armour wires, extending along the first axial section are thus joined at the joint location with a respective metal element, or armour wire, extending along the second axial section.

According to one example the element is an insulation system comprising an inner semiconducting layer, an insulation layer arranged outside the inner semiconducting layer, and an outer semiconducting layer arranged outside the insulation layer, wherein the insulation system has a radial thickness that is the same or essentially the same along the first axial section, the second axial section, and the joint location. The radial thickness may for example at most deviate by 10%, such as at most 5%, at the joint location relative to the radial thickness along the first axial section and the second axial section.

According to one embodiment the dynamic submarine power cable has an outer serving or outer sheath, wherein the bend restriction device is arranged around the outer serving or outer sheath.

According to one embodiment the joint location has been formed in the factory. The joint location could alternatively have been formed on a cable laying vessel.

According to one embodiment in a first axial direction along the dynamic submarine power cable the bend restriction device has a gradually increasing stiffness before the joint location and a gradually decreasing stiffness after the joint location.

According to one embodiment the bend restriction device has a main body that includes a first conical end section and a second conical end section directed opposite to the first conical end section.

The submarine power cable may be a high voltage AC or DC power cable.

According to one embodiment the dynamic submarine power cable is an AC power cable and has a rated voltage of at least 66 kV, or wherein the dynamic submarine power cable is an DC power cable and has a rated voltage of at least 80 kV.

There is according to a second aspect of the present disclosure provided an offshore system comprising: a floating structure, a submarine power cable system according to the first aspect, wherein the dynamic submarine power cable extends from the floating structure to the seabed, wherein the bend restriction device is arranged in the water column between the water surface and the seabed.

The floating structure may for example be a floating wind turbine, a floating substation, a floating hydrocarbon platform, a floating hydrocarbon vessel, a semi-submersible platform, or any other offshore floating structure which generates electric power or consumes electrical power.

One embodiment comprises a buoyancy device or devices arranged to lift a cable section of the dynamic submarine power cable, wherein the bend restriction device is arranged along a section of the submarine power cable between the floating structure and a contact point between the buoyancy device or devices and the dynamic submarine power cable, or between the seabed and a contact point between the buoyancy device or devices and the dynamic submarine power cable.

Generally, all terms used in the claims are to be interpreted according to their ordinary meaning in the technical field, unless explicitly defined otherwise herein. All references to "a/an/the" element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
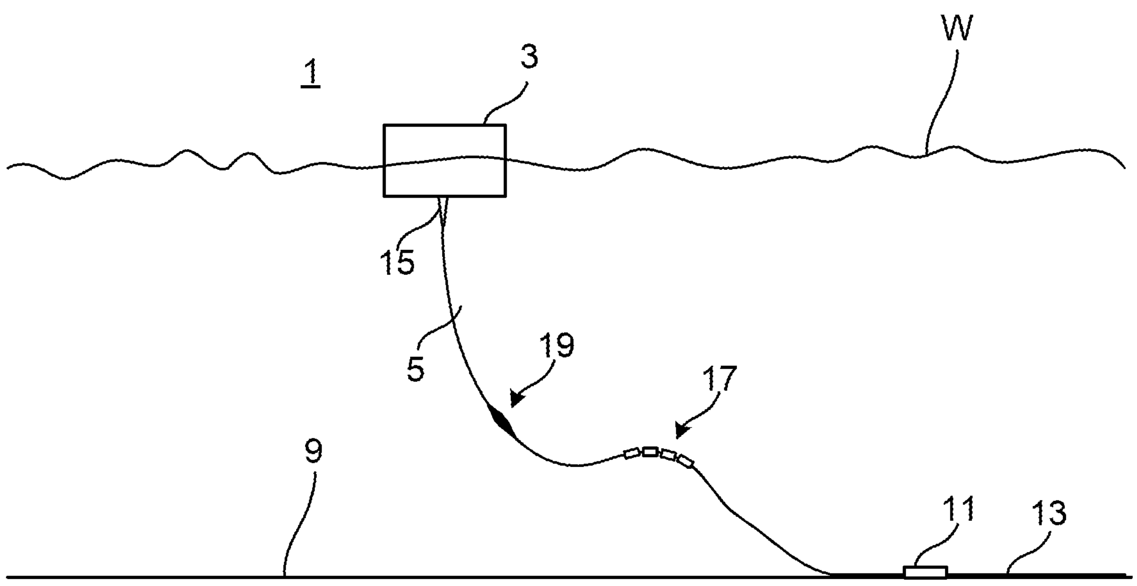
FIG. 1. schematically shows an offshore system.

FIG. 1 shows an example of an offshore system 1. The offshore system 1 comprises a floating structure 3 and a dynamic submarine power cable 5.

The offshore system 1 is deployed in water W such as sea water. In particular, the floating structure 3 is deployed in the water W and floats on the water surface.

The floating structure 3 may for example be a floating wind turbine, a floating substation, a floating hydrocarbon platform, a floating hydrocarbon vessel, a semi-submersible platform, or any other offshore floating structure which generates electric power, consumes electrical power, or transforms power between different voltages and/or between AC and DC.

The dynamic submarine power cable 5 is connected to the floating structure 3 and extends from the floating structure 3 to the seabed 9. Hereto, a top end of the dynamic submarine power cable 5 is connected to the floating structure 3.

The offshore system 1 may comprise joint 11, such as a rigid or flexible joint. The joint 11 may be transition joint. The joint 11 is arranged on the seabed 9. A bottom end of the dynamic submarine power cable 5 may be connected to the joint 11.

The offshore system 1 may comprise a static submarine power cable 13 extending on or under the seabed 9. The static submarine power cable 13 may be connected to the joint 11. The joint 11 may thus connect the dynamic submarine power cable 5 to the static submarine power cable 13.

The offshore system 1 may comprise a bend stiffener or bellmouth 15, attached to the offshore structure 3. The bend stiffener or bellmouth 15 is arranged around the dynamic submarine power cable 5, restricting lateral movement of the dynamic submarine power cable 5 close to the offshore structure 3 where the dynamic submarine power cable 5 is subjected to the highest bending forces due to wave motions.

The offshore system 1 may comprise one or more buoyancy devices 17. The buoyancy device or devices 17 may be arranged around or underneath the dynamic submarine power cable 5 in a region between the top end and the bottom end to lift the dynamic submarine power cable 5 to form an S-shaped, or essentially S-shaped cable section of the dynamic submarine power cable 5. The buoyancy device or devices 17 may be buoyancy modules or a subsea buoy, for example.

The offshore system 1 comprises a bend restriction device 19. The bend restriction device 19 is arranged around a section of the dynamic submarine power cable 5, which is located in a water column between the water surface and the seabed 9. The dynamic submarine power cable 5 and the bend restriction device 19 form a dynamic submarine power cable system.

The bend restriction device 19 is configured to restrict or limit the bending of the dynamic submarine power cable 5 along the section where it is arranged around the dynamic submarine power cable 5. The bend restriction device 19 limits the attainable minimum bending radius of the dynamic submarine power cable 5, thereby reducing bend-induced fatigue damage in the section covered by the bend restriction device 19.

The dynamic submarine power cable 5 comprises an element having a first axial section and a second axial section which are joined at a joint location. The element may for example be a metallic water blocking layer or a conductor. The bend restriction device 19 is arranged around the dynamic submarine power cable 5 where the joint location is located. The bend restriction device 19 thus extends axially over the joint location, limiting the bending of the dynamic submarine power cable 5 over the joint location.

Figure 2:
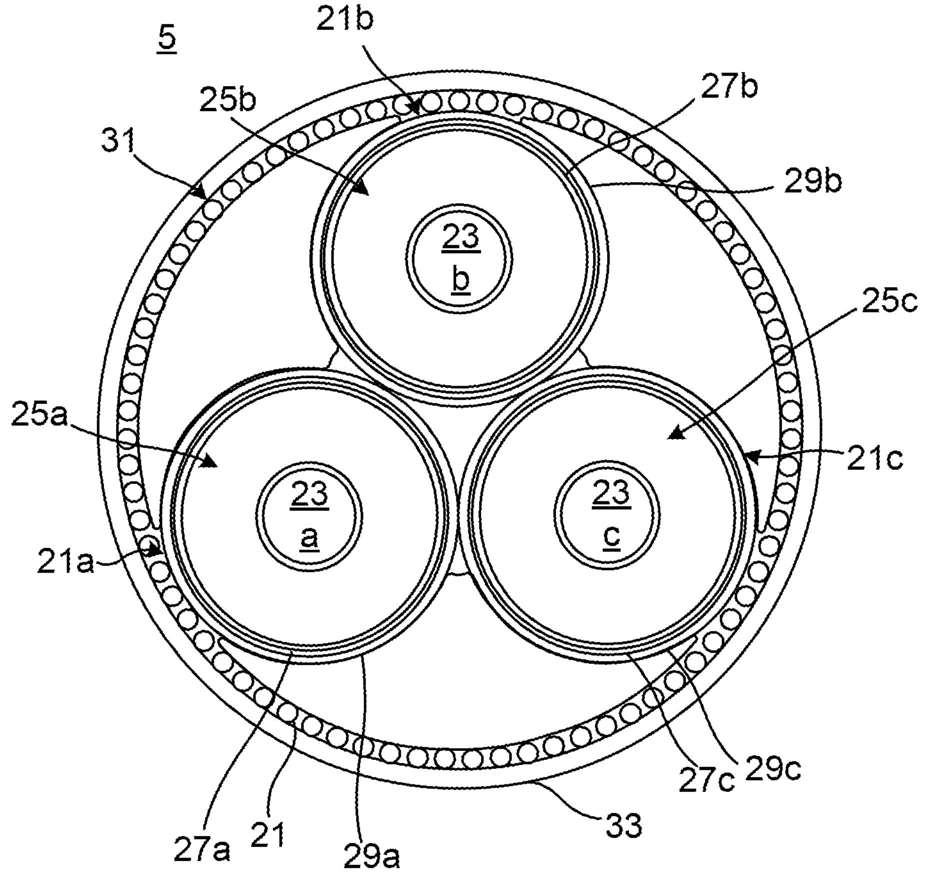
FIG. 2 schematically shows a close-up cross-sectional view of an example of a dynamic submarine power cable.

FIG. 2 shows a cross-section of an example of the dynamic submarine power cable 5. The exemplified dynamic submarine power cable 5 is a multi-core power cable but could alternatively be a single core power cable.

The dynamic submarine power cable 5 may be a high voltage AC or DC power cable.

The exemplified dynamic submarine power cable 5 comprises three cores 21*a*-21*c*. Each power core 21*a*-21*c* comprises a respective conductor 23*a*-23*c* and a respective insulation system 25*a*-25*c* arranged around the conductor 23*a*-23*c*. Each insulation system 25*a*-25*c* comprises an inner semiconducting layer, an insulation layer arranged outside the inner semiconducting layer, and an outer semiconducting layer arranged outside the insulation layer.

Each power core 21*a*-21*c* may comprise a metallic water blocking layer 27*a*-27*c* arranged concentrically or essentially concentrically with the conductor 23*a*-23*c*, outside the insulation system 25*a*-25*c*.

According to one example, the metallic water blocking layer 27*a*-27*c* is the aforementioned element that has a first axial section and a second axial section which are joined at a joint location. Hereto, the first axial section of the metallic water blocking layer 27*a*-27*c* may be corrugated and the second axial section of the metallic water blocking layer 27*a*-27*c* may be smooth. That the metallic water blocking layer 27*a*-27*c* is smooth means that it is non-corrugated. The metallic water blocking layer 27*a*-27*c* thus has a smooth inner and outer surface without any corrugations along the second axial section. The joint location is where the metallic water blocking layer 27*a*-27*c* transitions from being corrugated to being smooth, in an axial direction from the top end to the bottom end of the dynamic submarine power cable 5. The jointing of the corrugated and the smooth, or non-corrugated, metallic water blocking layer 27*a*-27*c* may be performed in the factory or on a cable laying vessel.

The first axial section may extend from the joint location all the way to the top end. The second axial section may extend from the joint location all the way to the bottom end.

According to one example the metallic water blocking layer may be smooth or corrugated along both the first axial section and the second axial section.

The submarine power cable system may comprise more than one joint location, and a corresponding number of bend restriction devices, each being provided around and extending axially over a respective joint location.

According to one example, one or more of the conductors 23*a*-23*c* has a joint, and the element may in this case be the conductor 23*a*-23*c*. The joint location may in this case be a conductor joint. Typically, the conductor joint has been made in the factory but could alternatively be made on a cable laying vessel. The conductor joint may typically be a welded conductor joint. The insulation system 25*a*-25*b* may or may not have been jointed in case a conductor joint is present.

Jointing of elements such as the metallic water blocking layer 27*a*-27*c* and the conductor in the factory are characterised by that the jointing cannot be detected from visual inspection of the dynamic submarine power cable 5 after manufacturing.

The dynamic submarine power cable 5 comprises a respective polymer sheath 29*a*-29*c* arranged outside each metallic water blocking layer 27*a*-27*c*.

The dynamic submarine power cable 5 may comprise one or more armour layers 31 arranged around all the power cores 21*a*-21*c*. The armour layer(s) 31 may comprise metal elements such as round or flat wires or ropes, for example made of galvanized steel or austenitic stainless steel, synthetic wires such as jacketed aramid fibres, or a combination of both metal wires and synthetic wires.

The dynamic submarine power cable 5 may have an outer serving or outer sheath 33 arranged outside the one or more armour layers 31.

In cases where the dynamic submarine power cable 5 comprises only one electric phase or pole, the dynamic submarine power cable 5 has the same structure as one of the power cores, i.e., it comprises a conductor, an insulation system, metallic water blocking layer, and polymer sheath. The armour layer(s) is/are arranged around the single power core.

Figures 3, 4:
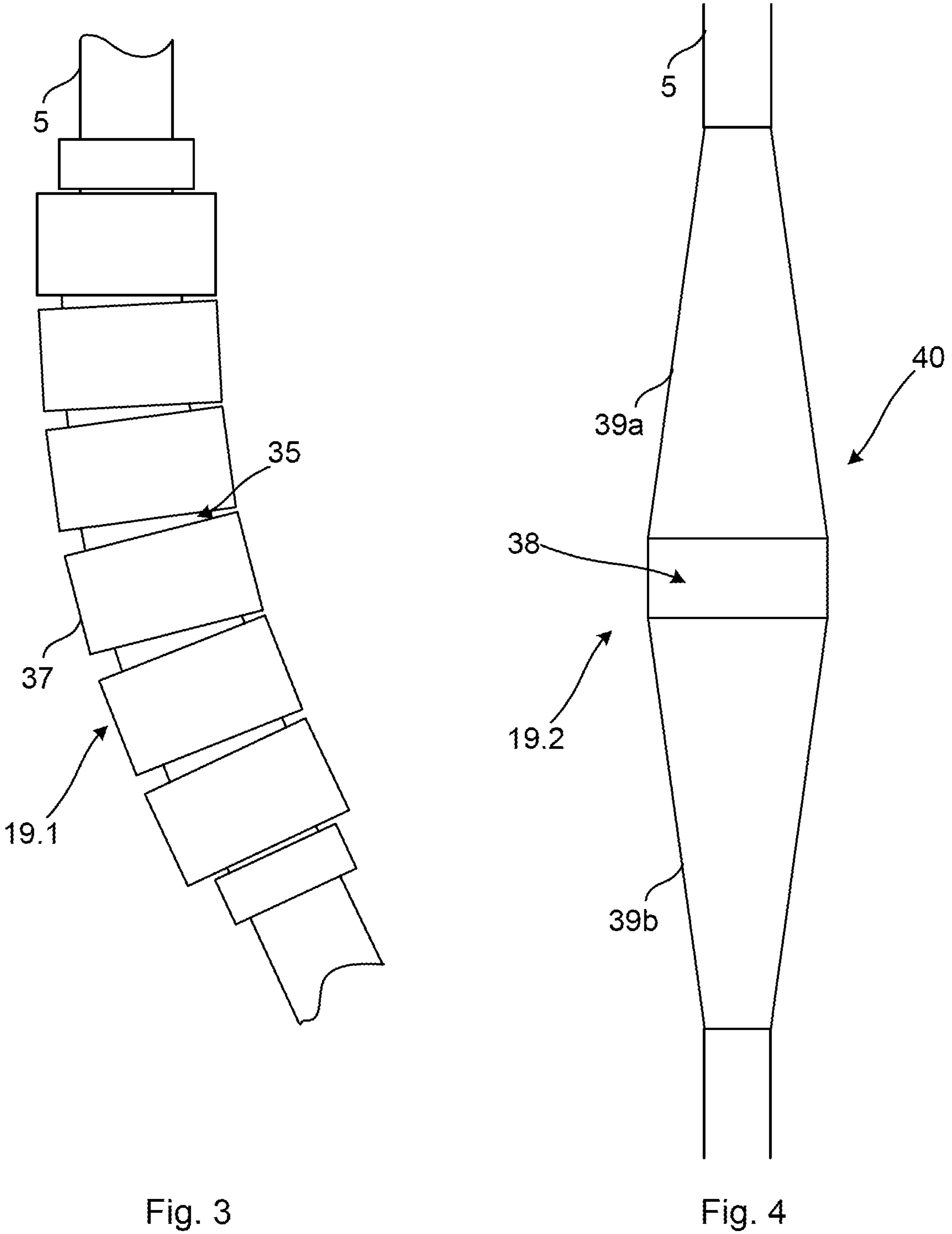
FIG. 3 schematically shows an example of a bend restriction device arranged around a dynamic submarine power cable.
FIG. 4 schematically shows another example of a bend restriction device arranged around a dynamic submarine power cable.

FIG. 3 shows an example implementation of the dynamic submarine power cable system. In this example, the bend restriction device 19.1 is a bend restrictor placed around the dynamic submarine power cable 5 over the joint location 35 of the jointed element. In this example the bend restriction device 19.1 comprises a plurality of segments 37 arranged articulately linked to each other, which restrict the bending of the dynamic submarine power cable 5.

FIG. 4 shows another example implementation of the dynamic submarine power cable system. The bend restriction device 19.2 is placed around the dynamic submarine power cable 5 over the joint location 35 of the jointed element, its axial position here indicated by the arrow 38.

In this example, the bend restriction device 19.2 has a gradually increasing stiffness before the joint location 35 and a gradually decreasing stiffness after the joint location 35 in a first axial direction along the dynamic submarine power cable 5.

The bend restriction device 19.2 has a main body 40 that includes a first conical end section 39*a* and a second conical end section 39*b*. The second conical end section 39*b* is directed opposite to the first conical end section 39*a*. The first conical end section 39*a* and the second conical end section 39*b* may be composed of a polymeric material.

The bend restriction device 19.2 in FIG. 4 may be a bend stiffener or two bend stiffeners that have been connected to each other.

According to any example disclosed herein, the bend restriction device 19, 19.1, 19.2 may extend at least 1 meter axially in both axial directions of the dynamic submarine power cable 5 from the joint location 35.

According to one example, more than one element of the submarine power cable may be jointed. For example, two dynamic submarine power cable lengths may have been joined to form the dynamic submarine power cable. In this case, the conductor(s), insulation system(s), as well as all other layers of the two submarine power cable lengths have been joined. According to one example each of the two dynamic submarine power cable lengths, or sections, divided by the joint, may have the same structure. For example, if the metallic water blocking layer is present, the metallic water blocking layer may be corrugated or smooth along both sections.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A submarine power cable system comprising:
- a dynamic submarine power cable having an element with a first axial section and a second axial section which are joined at a joint location; and
- a bend restriction device arranged around the dynamic submarine power cable;
- wherein the bend restriction device extends axially over the joint location, and wherein the bend restriction device is configured to restrict bending of the dynamic submarine power cable at the joint location;
- wherein the element is a metallic water blocking layer; and
- wherein the metallic water blocking layer is corrugated along the first axial section and smooth along the second axial section.

2. The submarine power cable system as claimed in claim 1, wherein the bend restriction device includes at least one of a bend stiffener, a bend restrictor, a tube, or a pipe.

3. The submarine power cable system as claimed in claim 1, wherein the dynamic submarine power cable has a top end to which the first axial section extends, and a bottom end to which the second axial section extends.

4. The submarine power cable system as claimed in claim 3, wherein the joint location is arranged at a distance of at least 50 m from the top end and from the bottom end.

5. The submarine power cable system as claimed in claim 1, wherein the metallic water blocking layer includes a copper material or stainless steel.

6. The submarine power cable system as claimed in claim 1, wherein the dynamic submarine power cable has an outer serving or outer sheath, wherein the bend restriction device is arranged around the outer serving or outer sheath.

7. The submarine power cable system as claimed in claim 1, wherein the joint location has been formed in the factory.

8. The submarine power cable system as claimed in claim 1, wherein in a first axial direction along the dynamic submarine power cable the bend restriction device has a gradually increasing stiffness before the joint location and a gradually decreasing stiffness after the joint location.

9. The submarine power cable system as claimed in claim 1, wherein the bend restriction device has a main body that includes a first conical end section and a second conical end section directed opposite to the first conical end section.

10. The submarine power cable system as claimed in claim 1, wherein the dynamic submarine power cable in an AC power cable and has a rated voltage of at least 66 kV, or wherein the dynamic submarine power cable is a DC power cable and has a rated voltage of at least 80 kV.

11. An offshore system comprising:
- a floating structure; and
- a submarine power cable system including:
  - a dynamic submarine power cable having an element with a first axial section and a second axial section which are joined at a joint location; and
  - a bend restriction device arranged around the dynamic submarine power cable;
  - wherein the bend restriction device extends axially over the joint location, wherein the bend restriction device is configured to restrict bending of the dynamic submarine power cable at the joint location;
  - wherein the element is a metallic water blocking layer; and
  - wherein the metallic water blocking layer is corrugated along the first axial section and smooth along the second axial section; and
- wherein the dynamic submarine power cable extends from the floating structure to the seabed, wherein the bend restriction device is arranged in a water column between the water surface and the seabed.

12. The offshore system as claimed in claim 11, comprising a buoyancy device or devices arranged to lift a cable section of the dynamic submarine power cable, wherein the bend restriction device is arranged along a section of the submarine power cable between the floating structure and a contact point between the buoyancy device or devices and the dynamic submarine power cable, or between the seabed and a contact point between the buoyancy device or devices and the dynamic submarine power cable.

13. The submarine power cable system as claimed in claim 2, wherein the dynamic submarine power cable has an outer serving or outer sheath, wherein the bend restriction device is arranged around the outer serving or outer sheath.

14. The submarine power cable system as claimed in claim 2, wherein the joint location has been formed in the factory.

15. The submarine power cable system as claimed in claim 2, wherein in a first axial direction along the dynamic submarine power cable the bend restriction device has a gradually increasing stiffness before the joint location and a gradually decreasing stiffness after the joint location.

* * * * *